(12) United States Patent
Shimizu (10) Patent No.: US 8,911,136 B2
(45) Date of Patent: Dec. 16, 2014

(54) ILLUMINATION APPARATUS AND DISPLAY DEVICE

(75) Inventor: Takaharu Shimizu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 152 days.

(21) Appl. No.: 13/580,007

(22) PCT Filed: Jan. 13, 2011

(86) PCT No.: PCT/JP2011/050413
§ 371 (c)(1),
(2), (4) Date: Aug. 20, 2012

(87) PCT Pub. No.: WO2011/122060
PCT Pub. Date: Oct. 6, 2011

(65) Prior Publication Data
US 2012/0320630 A1  Dec. 20, 2012

(30) Foreign Application Priority Data

Mar. 31, 2010 (JP) ................................. 2010-080450

(51) Int. Cl.
*F21V 7/04* (2006.01)
*F21V 8/00* (2006.01)

(52) U.S. Cl.
CPC ............ *G02B 6/0091* (2013.01); *G02B 6/0088* (2013.01)
USPC ............................. 362/634; 362/612; 362/631

(58) Field of Classification Search
USPC ......... 362/611, 612, 613, 615, 616, 631, 632, 362/634
See application file for complete search history.

(56) References Cited

U.S. PATENT DOCUMENTS

| | | | | |
|---|---|---|---|---|
| 7,270,467 | B2 * | 9/2007 | Kim | 362/634 |
| 7,490,973 | B2 * | 2/2009 | Fujikawa et al. | 362/634 |
| 7,527,420 | B2 * | 5/2009 | Kim | 362/634 |
| 7,651,258 | B2 * | 1/2010 | Kim | 362/634 |
| 7,883,260 | B2 * | 2/2011 | Kim | 362/634 |
| 8,297,823 | B2 * | 10/2012 | Cho et al. | 362/606 |
| 8,421,950 | B2 * | 4/2013 | Kim et al. | 349/58 |
| 8,579,454 | B2 * | 11/2013 | Kuromizu | 362/97.2 |
| 8,636,399 | B2 * | 1/2014 | Cho et al. | 362/606 |
| 2006/0203515 | A1 * | 9/2006 | Fujikawa et al. | 362/615 |
| 2009/0273732 | A1 | 11/2009 | Shimura et al. | |
| 2013/0120669 | A1 * | 5/2013 | Kuromizu | 348/790 |

FOREIGN PATENT DOCUMENTS

| | | |
|---|---|---|
| JP | 5-20032 U | 3/1993 |
| JP | 2004-184493 A | 7/2004 |
| JP | 2008-4491 A | 1/2008 |
| JP | 2009-272096 A | 11/2009 |
| JP | 2009-277641 A | 11/2009 |

OTHER PUBLICATIONS

An International Search Report, dated Feb. 8, 2011 in International Application No. PCT/JP2011/050413.

* cited by examiner

*Primary Examiner* — John A Ward
(74) *Attorney, Agent, or Firm* — Lowe Hauptman & Ham, LLP (57) ABSTRACT

Provided is an illumination apparatus which prevents variations in the distance between the light-receiving surface of a light guide plate and a light source. Also provided is a display device which incorporates the illumination apparatus. The light guide plate, which constitutes a backlight unit, receives light through a light-receiving surface with the light-receiving surface oriented toward the light being emitted. In the backlight unit, pillars extend to intersect the direction of emission from an LED and are thus brought into contact with a device-carrying board and the light guide plate, which are superposed one on the other, thereby securing the device-carrying board and the light guide plate.

10 Claims, 7 Drawing Sheets

ILLUMINATION APPARATUS AND DISPLAY DEVICE

RELATED APPLICATIONS

The present application is based on International Application No. PCT/JP2011/050413, filed Jan. 13, 2011 and claims priority from, Japanese Application No. 2010-080450, filed Mar. 31, 2010.

TECHNICAL FIELD

The present invention relates to an illumination apparatus such as a backlight unit and the like, and to a display device (liquid crystal display device and the like) that incorporates the illumination apparatus.

BACKGROUND ART

Conventionally, a liquid crystal display device, which incorporates a liquid crystal display panel (display panel) of non-light emitting type, incorporates a backlight unit as well that supplies light to the liquid crystal display panel. It is desirable that the backlight unit generates surface light which spreads throughout the entire region of the surface-shaped liquid crystal display panel. To achieve this, the backlight unit sometimes includes a light guide plate that mixes light from an incorporated light source (e.g., a light emitting device such as an LED and the like) with a high degree.

Figure 8:
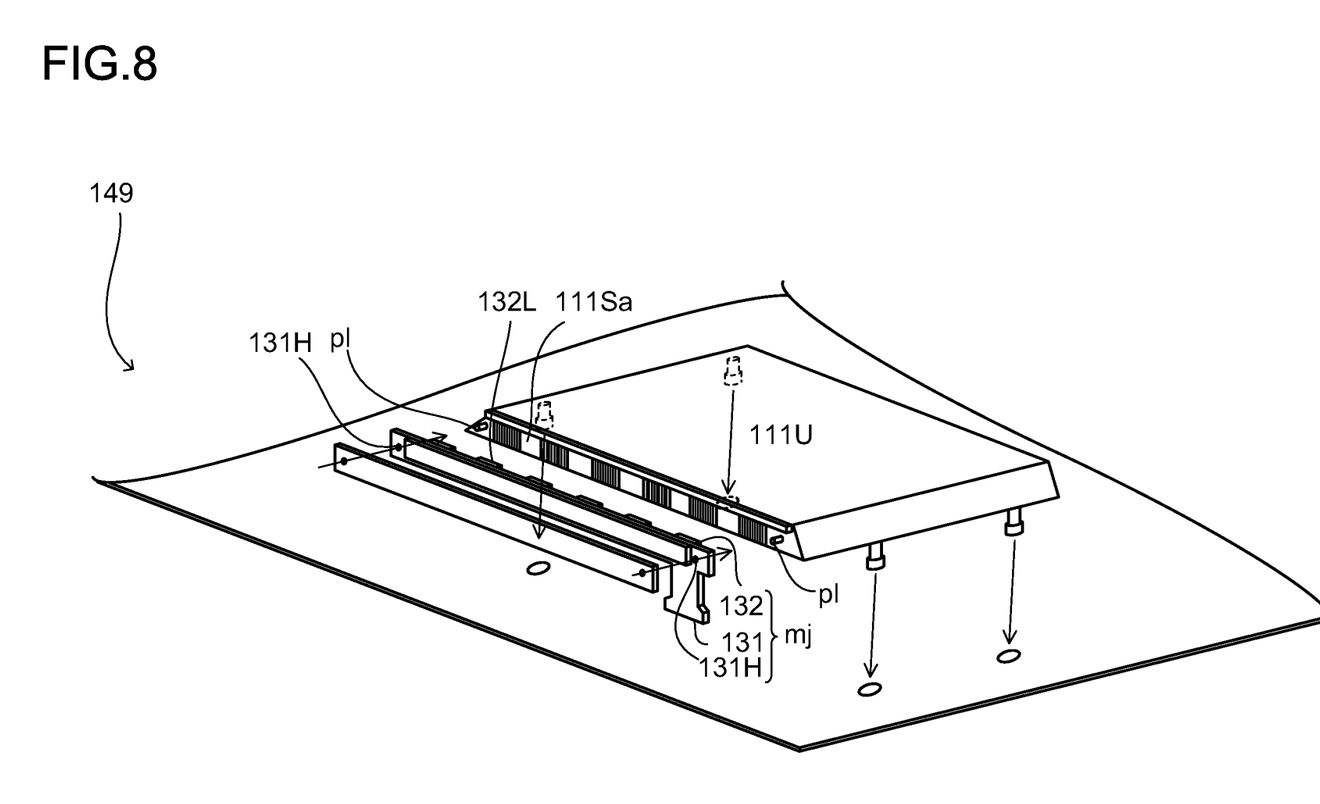
FIG. 8 is an exploded perspective view of a conventional backlight unit.

For example, as shown in FIG. 8, in a backlight unit 149 disclosed in a patent document 1, a light emitting surface 132L of an LED 132 of an LED module mj opposes a light reception surface 111Sa of a light guide plate 111 and supplies light to this light reception surface 111Sa. And, the light guide plate 111 makes the light undergo multiple reflection inside itself and outputs surface light from a top surface 111U.

CITATION LIST

Patent Literature

PLT1: JP-A-2009-272096

SUMMARY OF INVENTION

Technical Problem

In the meantime, in the backlight unit 149 in the patent document 1, a shaft pl formed on the light reception surface 111Sa of the light guide plate 111 fits in an opening 131H formed through a mount board 131. Because of this, the LED module mj does nor deviate along a thickness direction of the light guide plate 111 and a longitudinal direction of the light reception surface 111Sa.

However, the shaft pl of the light guide plate 111 is along a light output direction of the LED 132. Because of this, there is a risk that the LED module mj could move along the shaft direction and the output direction of LED 132. In other words, there is a risk that a distance between the light emitting surface 132L of the LED 132 and the light reception surface 111Sa of the light guide plate 111 could change.

And, if the change between the light emitting surface 132L of the LED 132 and the light reception surface 111Sa of the light guide plate 111 deviates from a predetermined distance, it is hard for the light output from the light guide plate 111 to become suitable surface light expected in the design, and for example, surface light including light amount unevenness is produced.

The present invention has been made in light of the above situation. And, it is an object of the present invention to provide an illumination apparatus that does not allow a change in distance between a light reception surface of a light guide plate and a light source; and a display device that incorporates the illumination apparatus.

Solution to Problem

The illumination apparatus includes: a light source; a mount board on which the light source is mounted; a light guide plate that faces a light reception surface toward a light emission direction of the light source to receive light via the light reception surface; and a stator that extends in a direction intersecting the light emission direction, touches the mount board and the light guide plate overlying each other, and fix the mount board and the light guide plate.

According to this, the stator intersects the emission direction of the light from the light source, accordingly, the mount board and the light guide plate, which are fixed by the stator, do not move along the emission direction. Because of this, a distance between the light emitting surface of the light source mounted on the mount board and the light reception surface of the light guide plate does not change. Accordingly, the light output from the light guide plate easily becomes suitable surface light expected in the design.

Here, the stator is, for example, a shaft disposed on the mount board; and the light guide plate is provided with an engagement portion that engages with the shaft.

Besides, in a case where the illumination apparatus includes a housing body that houses the light source, the mount board, the light guide plate and the stator, it is desirable that the stator is a shaft that is disposed on the housing body; and the light guide plate and the mount board are each provided with an engagement portion that engages with the shaft.

Here, it is desirable that the illumination apparatus meets the following formula:

$$RL \leq GL/4$$

where

RL: a shortest distance from the light reception surface to the engagement portion;

GL: a total length of the light guide plate in a direction along the light emission direction of the light source.

Usually, the light guide plate receives the light (heat) from the light source to thermally expand. Especially, the thermal expansion is prone to occur with respect to the engagement portion of the light guide plate. However, in the case where the formula (1) is met, the engagement portion is situated near the light reception surface of the light guide plate. Because of this, even if the light guide plate expands thermally to become deformed, the thermal expansion has a slight influence on a central portion and a near place of the surface light. Accordingly, the illumination apparatus is able to supply high-quality surface light.

Here, the engagement portion is not especially limited, but it is desirable that the engagement portion is a dimple, a cutout, or an opening.

Besides, it is desirable that a sectional shape of the engagement portion in a sectional direction with respect to a surface direction identical to the light output surface of the light guide plate has: a short edge along the light emission direction of the light source; and a long edge perpendicular to the light emission direction of the light source; and a transversal sectional shape of the shaft has a width that tightly fits in a gap between inner walls of the long edge of the engagement portion.

According to this, the distance between the light reception surface of the light guide plate and the light source does not easily change, while a clearance is produced between the engagement portion and the shaft in the direction perpendicular to the light emission direction of the light source. Because of this, the stator is easily mountable on the light guide plate.

Besides, in a case where the light source supplies the light to opposing two side surfaces of the light guide plate and the two side surfaces each define the light reception surface, to secure the easy mounting of the stator onto the light guide plate, a structure described below may be employed.

Specifically, in the sectional direction with respect to the surface direction identical to the light output surface of the light guide plate, it is desirable that the sectional shape of the engagement portion near one light reception surface has: a short edge along the light emission direction of the light source, and a long edge perpendicular to the light emission direction of the light source; and the transversal sectional shape of the shaft, which fits in the engagement portion near the one light reception surface, has a width that tightly fits in the gap between the inner walls of the long edge of the engagement portion. Further, the sectional shape of the engagement portion near the other light reception portion has: a long edge along the light emission direction of the light source, and a short edge perpendicular to the light emission direction of the light source; and the transversal sectional shape of the shaft, which fits in the engagement portion near the other light reception surface, has a width that tightly fits in the gap between the inner walls of the long edge of the engagement portion.

Here, it is desirable that the sectional shape of the engagement portion in the sectional direction with respect to the surface direction identical to the light output surface of the light guide plate is an elliptic shape that has a minor axis along the short edge and a major axis along the long edge, or a tongue shape that includes an elliptic shape; and further, it is desirable that the transversal sectional shape of the shaft is a perfect circle that tightly fits in the gap between the inner walls of the long edge of the engagement portion.

Besides, in a case where a plurality of the engagement portions are formed, it is desirable that one sectional shape of the engagement portion in the sectional direction with respect to the surface direction identical to the light output surface of the light guide plate is a perfect circle whose length along the light emission direction of the light source and whose length perpendicular to the light emission direction of the light source are equal to each other; and the transversal sectional shape of the shaft, which fits in the perfect circular engagement portion is a perfect circle that tightly fits in the gap between the inner walls of the long edge of the engagement portion.

According to this, the engagement portion and the shaft fitting in each other define a reference, accordingly, there may be a clearance between another engagement portion and another shaft fitting in each other. Because of this, the stator becomes easily mountable on the light guide plate.

Besides, it is sayable that also a display device, which includes the above apparatus and a display panel that receives the light from the illumination apparatus, is the present invention.

Advantageous Effects of Invention

According to the present invention, the mount board and the light guide plate overlying each other come not to move. Especially, the light guide plate does not move with respect to the mount board along the light emission direction of the light source mounted on the mount board. Because of this, the distance between the light emitting surface of the light source mounted on the mount board and the light reception surface of the light guide plate does not change, and the light output from the light guide plate easily becomes the suitable surface light expected in the design.

DESCRIPTION OF EMBODIMENTS

Embodiment 1

An embodiment is described based on drawings as follows. Here, for the sake of convenience, there is a case where hatching, a member reference number and the like are omitted; in such a case, other drawings are referred to. Besides, a black dot in a drawing means a direction perpendicular to the paper surface.

Figure 1:
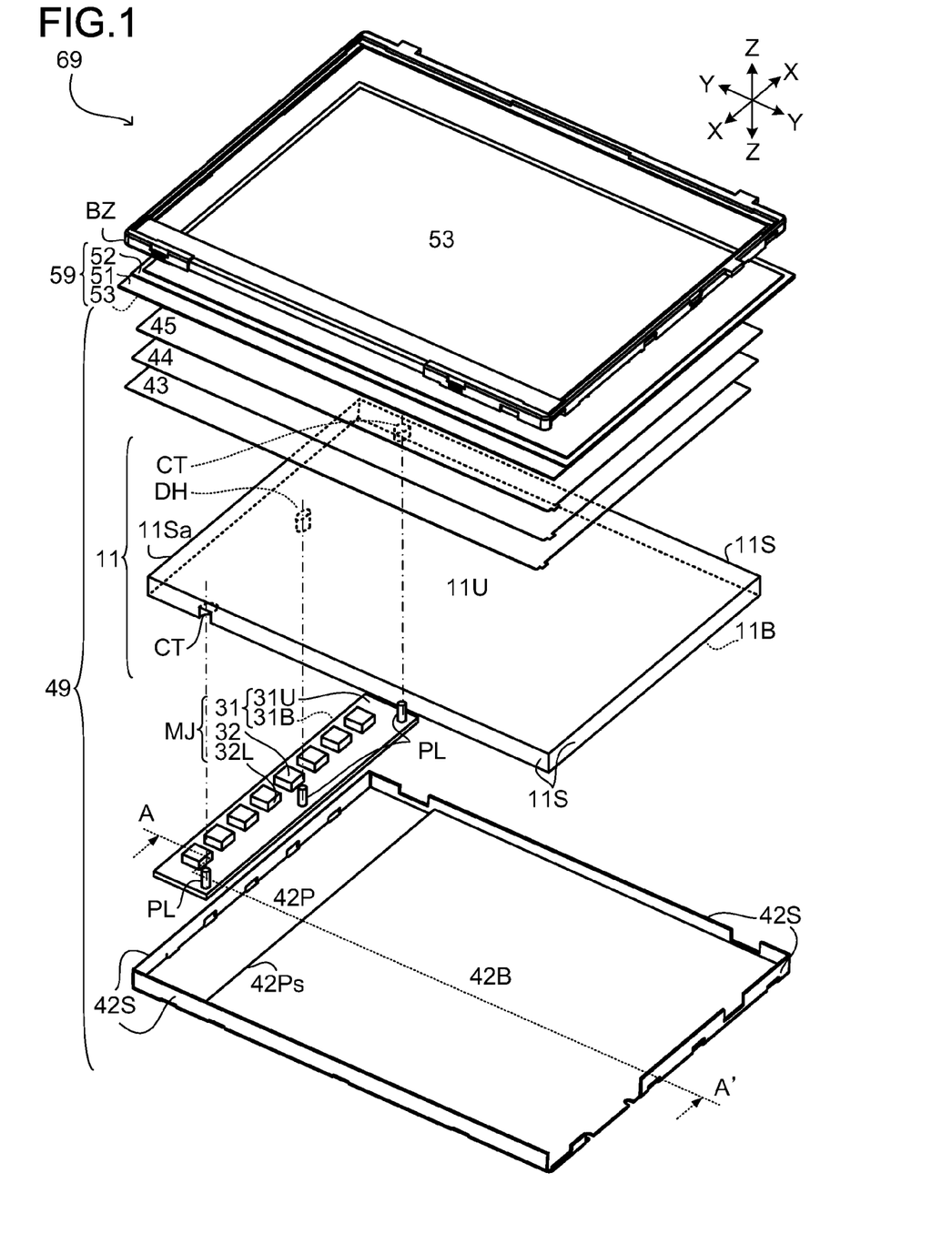
FIG. 1 is an exploded perspective view of a liquid crystal display device.

FIG. 1 is an exploded perspective view of a liquid crystal display device 69 (for the sake of convenience, a reflection sheet 41 later described is skipped in FIG. 1 and shown in a sectional view of FIG. 2 later described). As shown in FIG. 1, the liquid crystal display device 69 includes a liquid crystal display panel 59 and a backlight unit 49 (here, the liquid crystal display panel 59 is protected by a frame-shaped bezel BZ).

The liquid crystal display panel 59 attaches an active matrix board 51 that includes switching elements such as a TFT (Thin Film Transistor) and the like to an opposite board 52 opposing the active matrix board 51 by means of a seal material (not shown). And, liquid crystal (not shown) is injected into a gap between both boards 51 and 52.

Here, a light polarization film 53 is disposed on a light receiving side of the active matrix board 51 and an output side of the opposite board 52. And, the above liquid crystal display panel 59 makes use of a change in light transmittance due to an inclination of liquid crystal molecules, thereby displaying an image.

Next, the backlight unit 49, which is situated right under the liquid crystal display panel 59, is described. The backlight unit 49 includes: an LED module (light source module) MJ; a light guide plate 11; a reflection sheet 41 (see FIG. 2); a backlight chassis 42; a diffusion plate 43; a prism sheet 44; and a lens sheet 45.

The LED module MJ is a module that emits light and includes: a mount board 31; and an LED (Light Emitting Diode) 32 mounted on a board surface of the mount board 31.

The mount board 31 is a plate-shaped and rectangular board, and a plurality of electrodes (not shown) are arranged on a mount surface 31U. And, the LEDs 32 are mounted on these electrodes that are linearly arranged. Here, the backlight unit 49 incorporates one mount board 31; an extension direction of the mount board 31 is defined as an X direction, a direction, which intersects (meets at right angles and the like) the X direction and is an emission direction of the LED 32, is defined as a Y direction, and a direction, which intersects (meets at right angles and the like) the X direction and the Y direction, is defined as a Z direction.

The LED 32 receives supply of an electric current via the electrode (not shown) that is formed on the mount surface of the mount board 31, thereby emitting light (here, a light emitting surface 32L of the LED 32 intersects a board surface direction of the mount board 31, whereby the light emission direction of the LED 32 is along the board surface direction). Besides, to secure a light amount, it is desirable a plurality of the LEDs (light emitting device, point light source) 32 are mounted on the mount board 31. However, in the figure, for the sake of convenience, only part of the LEDs 32 are shown.

The light guide plate 11 is a plate-shaped member that has: a side surface 11S; a top surface 11U and a bottom surface 11B which are situated oppositely so as to sandwich the side surface 11S. And, a surface (light reception surface 11Sa) of the side surface 11S faces the light emitting surface 32L of the LED 32, thereby receiving the light from the LED 32. The received light undergoes multiple reflection in an inside of the light guide plate 11 and goes out as the surface light from the top surface (output surface) 11U to outside.

The reflection sheet 41 (see FIG. 2) is a sheet covered by the bottom surface 11B of the light guide plate 11, and a reflection surface of the sheet faces the bottom surface 11B of the light guide plate 11. And, the reflection sheet 41 reflects light leaking from the bottom surface 11B of the light guide plate 11 back to the light guide plate 11, thereby preventing light loss.

The backlight chassis (housing body) 42, as shown in FIG. 1, is a box-shaped member, for example, and houses the reflection sheet 41, the light guide plate 11, the LED modules MJ, the diffusion plate 43, the prism sheet 44, and the lens sheet 45.

The diffusion plate 43 is an optical member that overlies the top surface 11U of the light guide plate 11 and diffuses the light output from the light guide plate 11. In other words, the diffusion plate 43 diffuses the surface light formed by the light guide plate 11 to spread the light to the entire region of the liquid crystal display panel 59.

The prism sheet 44 is an optical member that overlies the diffusion plate 43. And, on the prism sheet 44, triangular prisms each extending in one direction (linear) are arranged on a sheet surface in a direction that intersects the one direction. According to this, the prism sheet 44 deflects a radiation characteristic of the light from the diffusion plate 43.

The lens sheet 45 is an optical member that overlies the prism sheet 44. And, in an inside of the lens sheet 45, microparticles for refracting and scattering the light are dispersed. According to this, the lens sheet 45 does not locally concentrate the light from the prism sheet 44, thereby curbing brightness difference (light-amount unevenness).

And, the above-described backlight unit 49 changes the light from the plurality of LED modules MJ into the surface light by means of the light guide plate 11, transmits the surface light through the plurality of optical members 43 to 45, thereby supplying the light to the liquid crystal display panel 59. According to this, the liquid crystal display panel 59 of non-light emitting type receives the light (backlight) from the backlight unit 49 to increase a display function.

Figure 2:
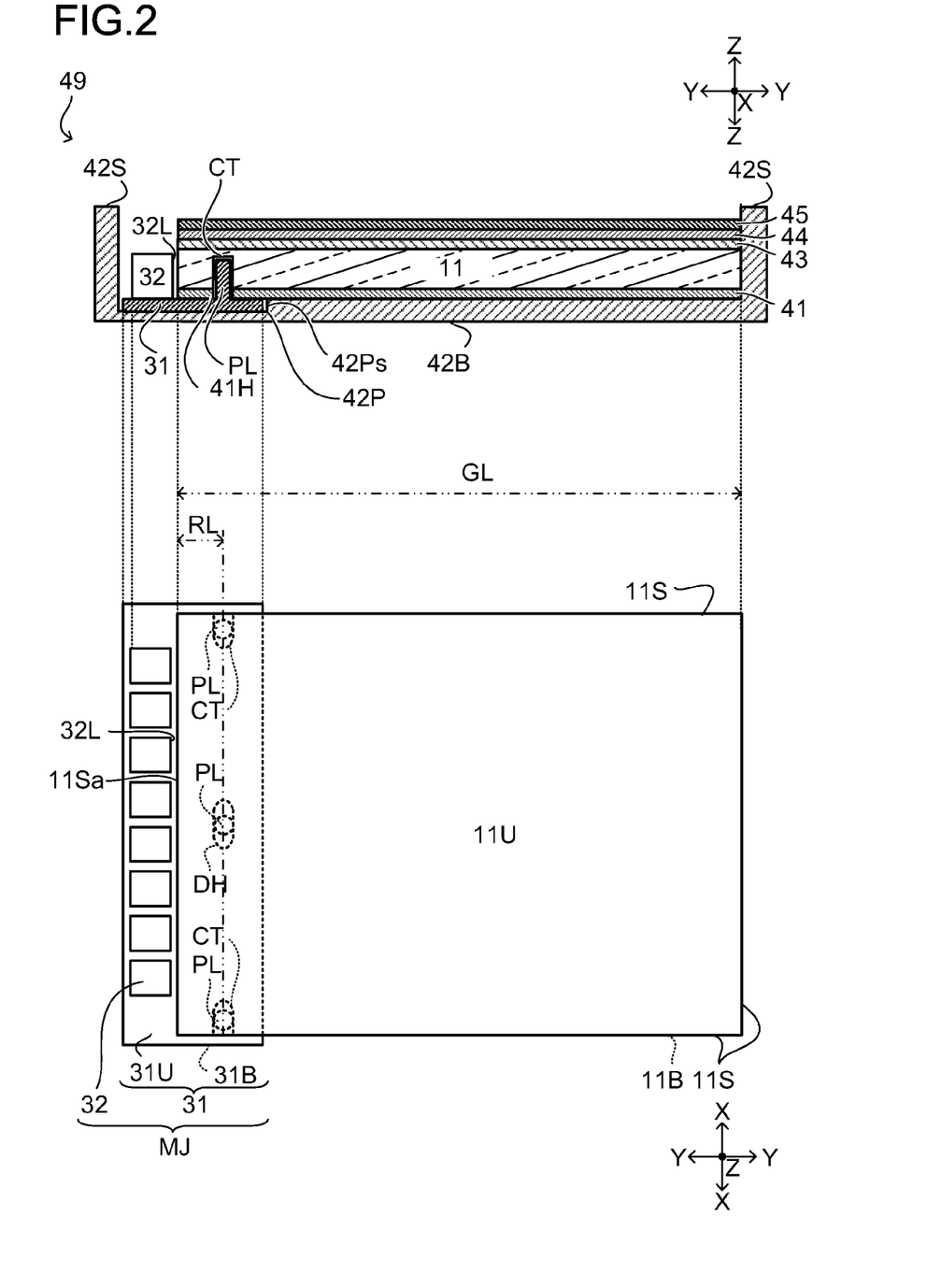
FIG. 2 is a 2-side view illustrating a sectional view and a plan view of a backlight unit.

Here, the light guide plate 11, the reflection sheet 41, the LED module MJ, and the backlight chassis 42 are described in detail by means of FIG. 1 and FIG. 2. Here, FIG. 2 is a 2-side view illustrating a partial sectional view and a plan view of the backlight unit 49 (incidentally, the sectional view is a sectional view taken in a direction of an arrow A-A' of FIG. 1, and the plan view chiefly illustrates the light guide plate and the LED module MJ for the sake of convenience.).

The light guide plate 11, as shown in FIG. 1 and FIG. 2, is provided with a cutout CT and a dimple DH. In detail, as for the cutout (engagement portion) CT, cutting-away extends from the bottom surface 11B of the light guide plate 11 toward the top surface 11U and the cutting-away reaches the side surface 11S of the light guide plate 11, whereby the cutout CT is formed (however, the cutting-away does not reach the top surface 11U.). On the other hand, as for the dimple (engagement portion) DH, cutting-away extends from the bottom surface 11B of the light guide plate 11 toward the top surface 11U, whereby the dimple DH is formed (however, like the cutout CT, the cutting-away for forming the dimple DH does not reach the top surface 11U.).

The reflection sheet 41 is covered by the bottom surface of the light guide plate 11. Because of this, the reflection sheet 41 is provided with a sheet opening 41H through positions that overlie the cutout CT and the dimple DH of the light guide plate 11 (here, a size of the sheet opening 41H is larger than outer circumferences of the cutout CT and the dimple DH.). In other words, the cutout CT and the dimple DH of the light guide plate 11 are not blocked by the reflection sheet 41 and exposed.

The LED module MJ is provided with a shaft (stator) PL that protrudes from the mount surface 31U of the mount board 31. The shafts PL disposed on the mount board 31 correspond to the cutout CT and the dimple DH of the light guide plate 11 (in short, oppose each other). Further, a shaft circumference (outer circumference) of the shaft PL is smaller than inner circumferences of the cutout CT and the dimple DH of the light guide plate 11. Because of this, the shaft PL fits into (engages with) the cutout CT and the dimple DH, whereby the LED module MJ comes not to move with respect to the light guide plate 11.

The backlight chassis 42 includes a step 42P on a bottom surface 42B that is able to house the mount board 31. In detail, the step 42P, which has an area slightly larger than an outer circumference of the mount board 31, is included in the backlight chassis 42. And, when the mount board 31 fits in a region of the step 42P (recessed step 42P) that sinks from the bottom surface 42B, even if the mount board 31 tries to move in a surface direction of the bottom surface 42B, the mount board 31 touches a side wall 42S of the backlight chassis 42 and a wall 42Ps of the step 42P, and comes not to move (here, a depth of the step 42P is slightly longer than a thickness of the mount board 31.).

The backlight unit 49, which includes the reflection sheet 41, the LED module MJ and the backlight chassis 42, is assembled as described hereinafter.

Specifically, the mount board 31 of the LED module MJ rests on the step 42P formed on the bottom surface 42B of the backlight chassis 42 with a non-mount surface 31B (rear surface 31B of the mount board 31U) facing the step 42P (here, the backlight chassis 42 and the mount board 31 may be fixed to each other by means of, for example, double-coated tape, or a screw.). According to this, the shaft PL of the mount board 31 extends upward with respect to the bottom surface 42B of the backlight chassis 42.

And, the reflection sheet 41 covers the bottom surface 42B of the backlight chassis 42 such that the shaft PL penetrates the sheet opening 41H. Because of this, the shaft PL is exposed through the sheet opening 41H of the reflection sheet 41.

Further, the light guide plate 11 is placed such that the cutout CT and the dimple DH fit onto the shaft PL. Here, the light reception surface 11Sa of the light guide plate 11 is designed to have a suitable distance from and not to touch the light emitting surface 32L of the LED 32 in the state where the shaft PL engages with the cutout CT and the dimple DH.

As described above, in the backlight unit 49 which incorporates the light guide plate 11 that faces the light reception surface 11Sa toward a light emission direction of the LED 32 to receive the light via the light reception surface 11Sa, the shaft PL extends in a direction that intersects the emission direction of the LED 32, touches the mount board 31 and the light guide plate 11 overlying each other, thereby fixing the mount board 31 and the light guide plate 11.

According to this, the shaft PL interests the emission direction of the LED 32, accordingly, the mount board 31 and the light guide plate 11 fixed by the shaft PL do not move in the emission direction. Because of this, the distance between the light emitting surface 32L of the LED 32 mounted on the mount board 31 and the light reception surface 11Sa of the light guide plate 11 does not change. Accordingly, the light output from the light guide plate 11 easily becomes suitable surface light expected in the design.

Besides, by only fitting the light guide plate 11 to the shaft PL, it is possible to assemble the LED module MJ and the light guide plate 11 while keeping a predetermined positional relationship between the light reception surface 11Sa and the light emitting surface 32L of the LED 32, accordingly, the assembly of the backlight unit 49 is easy. Especially, if there are a plurality of the shafts PL, the light guide plate 11 fitted to the shafts PL does not rotate.

Here, widths of the cutout CT and the dimple DH along the Y direction that is a direction meeting (intersecting) the light reception surface 11Sa at right angles are lengths substantially equal to a diameter of the shaft PL whose transversal cross section (sectional surface perpendicular to the shaft direction) is a perfect circle. If this is not met, even if the shaft PL fits into the cutout CT and the dimple DH, the light guide plate 11 moves in the Y direction with respect to the mount board 31, and the distance between the light reception surface 11Sa and the light emitting surface 32L of the LED 32 changes.

However, the widths of the cutout CT and the dimple DH along the X direction that is a long-edge direction of the light reception surface 11Sa may be longer than the diameter of the shaft PL. This is because when the shaft PL fits into the cutout CT and the dimple DH, the light guide plate 11 does not move in the Y direction with respect to the mount board 31 and the distance between the light reception surface 11Sa and the light emitting surface 32L of the LED 32 does not change. Besides, if there is not a little clearance (space) between the shaft PL and the cutout CT and between the shaft PL and the dimple DH, the assembly of the LED module MJ and the light guide plate 11 becomes onerous.

In other words, it is desirable that sectional shapes (in detail, shapes in a sectional direction along a surface direction identical to the top surface 11U of the light guide plate 11) of the cutout CT and the dimple DH have a short edge along the light emission direction of the LED 32 and a long edge perpendicular to the light emission direction of the LED 32 (e.g., an elliptic sectional shape that has a minor axis along the short edge and a major axis along the long edge, or a tongue-shaped sectional shape that includes an elliptic shape); and a transversal sectional shape of the shaft PL has a width (e.g., a perfect circular sectional shape) that tightly fits into a gap between inner walls of the long edge of the cutout CT and the dimple DH. According to this, the distance between the light reception surface 11Sa and the light emitting surface 32L of the LED 32 does not change, and the assembly of the LED module MJ and the light guide plate 11 becomes easy.

However, in a case where all the shafts PL have the perfect circular transversal sectional shape, the widths of the dimple DH in the X direction and the Y direction may be substantially equal to the diameter of the shaft. This is because according to this, the light guide plate 11 does not move in a surface direction (XY plane direction) of the mount board 31.

Here, in a case where the shaft PL does not have the perfect circular transversal sectional shape but has a polygon-shaped transversal sectional shape and the shaft PL fits into the dimple DH with no gap, the number of the shafts PL may be one. This is because even one shaft PL is able to prevent the movement of the light guide plate 11 in the XY plane direction with respect to the mount board 31. In short, the number of combinations of the engagement portion such as the cutout CT or the dimple DH and the shaft PL fitting in the engagement portion is not especially limited.

Besides, the position of the shaft PL is not limited to the mount surface 31U of the mount board 31. For example, as shown in an exploded perspective view of FIG. 3 and a 2-side view (the same way of illustrating as FIG. 2) of FIG. 4, the shaft PL may be formed not only on the mount board 31 but also on the step 42P of the bottom surface 42B of the backlight chassis 42 (however, a board opening (engagement portion) 31H, through which the shaft PL disposed on the step 42P of the backlight chassis 42 extends, must be formed through the mount board 31.).

Figure 3:
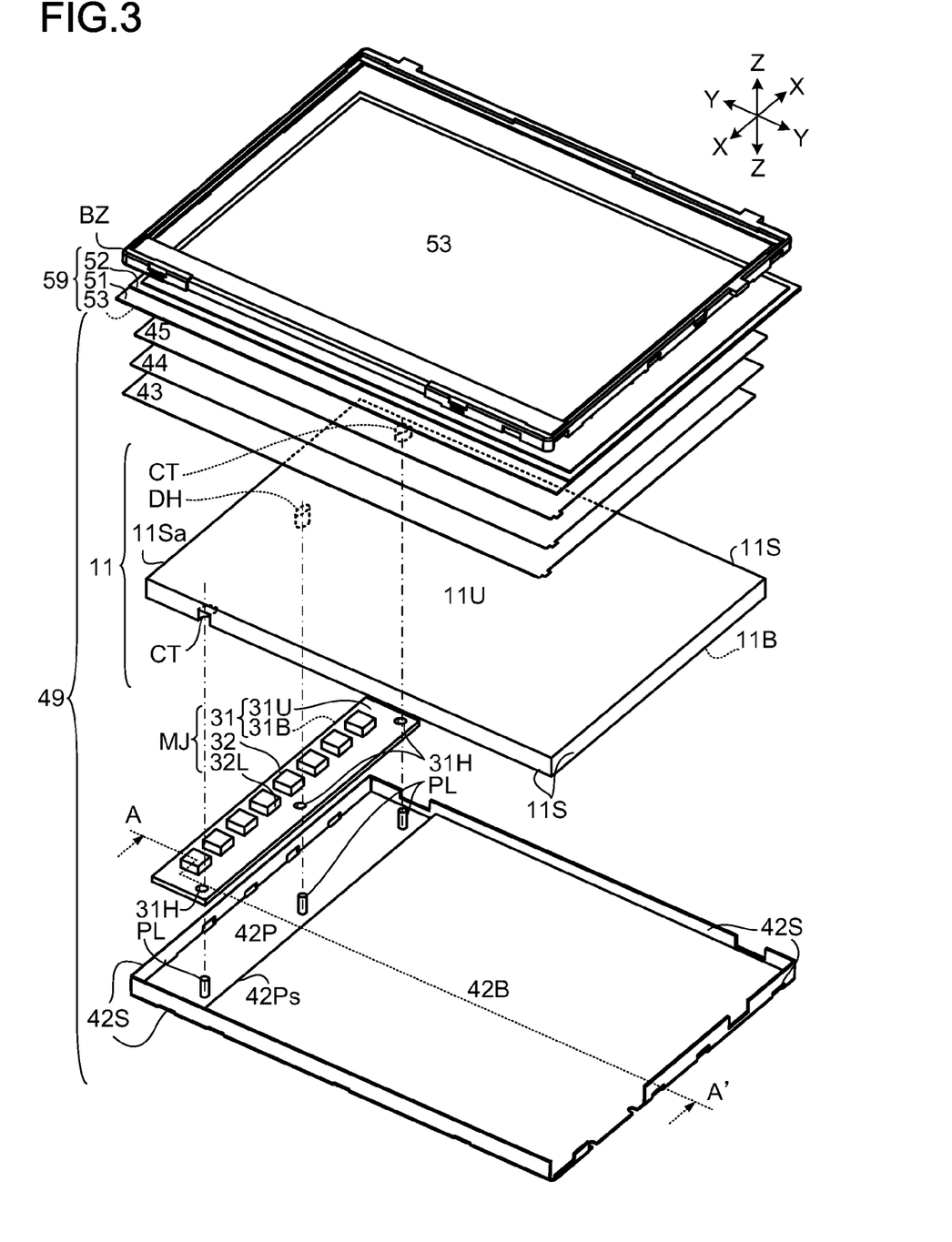
FIG. 3 is an exploded perspective view of a liquid crystal display device.
Figure 4:
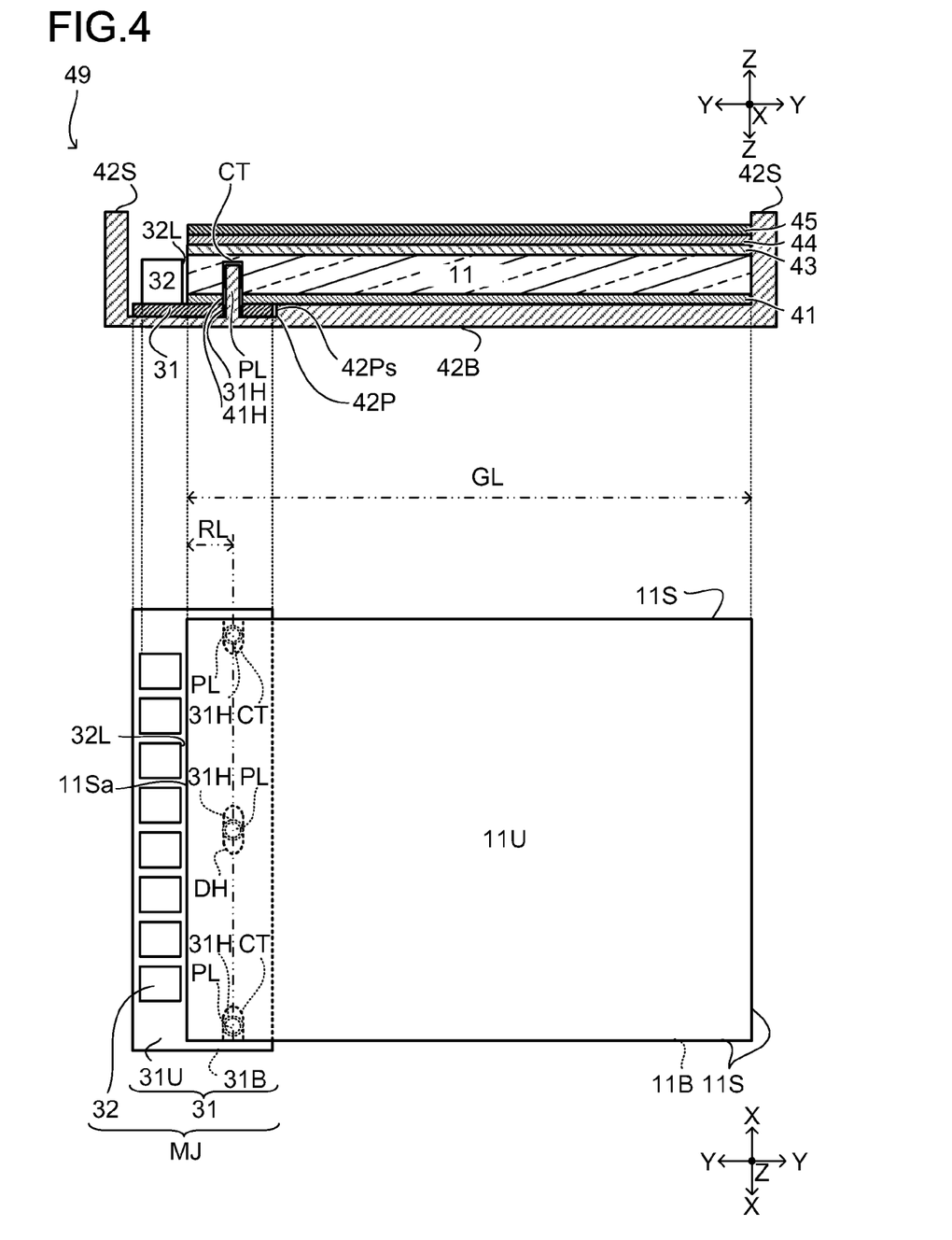
FIG. 4 is a 2-side view illustrating a sectional view and a plan view of a backlight unit.

In other words, the backlight chassis 42 houses not only the LED module MJ and the light guide plate 11 but also the shaft PL disposed on the step 42P of the bottom surface 42B. And, the shaft PL engages with the cutout CT and the dimple DH of the light guide plate 11 and the board opening 31H of the mount board 31, thereby fixing the mount board 31 and the light guide plate 11 that overlie each other.

Besides, as shown in FIG. 2 and FIG. 4, it is desirable that the backlight unit 49 meets the following formula (1):

$$RL \leq GL/4 \qquad \text{the formula (1)}$$

where

RL: a shortest distance from the light reception surface 11Sa of the light guide plate 11 to the cutout CT, or a shortest distance from the light reception surface 11Sa of the light guide plate 11 to the dimple DH;

GL: a total length of the light guide plate 11 in a direction along the light emission direction (e.g., the Y direction) of the LED 32.

Usually, the light guide plate 11 is made of resin, accordingly, thermally expands when receiving the light (heat) from the LED 32. Especially, the thermal expansion is prone to occur with respect to the cutout CT and the dimple DH of the light guide plate 11. Because of this, to secure the quality of the surface light from the light guide plate 11, for example, it is desirable to prevent the thermal expansion from occurring near a center of the light guide plate 11 that corresponds to a center of the surface light. To achieve this, it is desirable that the above formula (1) is met. According to this, the cutout CT and the dimple DH are disposed near an end of the light guide plate 11 that has a slight influence on the quality of the surface light, the quality of the surface light hardly deteriorates despite the cutout CT and the dimple DH.

Other Embodiments

Here, the present invention is not limited to the above embodiments, and various modifications are possible without departing the spirit of the present invention.

For example, the cutout CT and the dimple DH shown in FIG. 1 and FIG. 2 may have a shape that penetrates from the bottom surface 11B to the top surface 11U of the light guide plate 11 (e.g., the dimple DH may be an opening.). Besides, of the three openings 31H shown in FIG. 3 and FIG. 4, the outer two openings 31H may be a cutout disposed on the short edge of the mount board 31.

In short, in the case where the mount board 31 and the light guide plate 11 overlying each other are made not to move, the mount board 31, which is one member near the shaft PL, is sufficiently provided with the opening 31H or a cutout that penetrates from the non-mount surface 31B to the mount surface 31U such that the shaft PL reaches the light guide plate 11 which is the other member. Besides, the light guide plate 11 is sufficiently provided with the cutout CT, the dimple DH, or an opening to engage with the shaft PL.

Besides, the shaft PL is not limited to a bar shape that has a perfect circular transversal sectional shape or a polygonal transversal sectional shape, and may have a conic solid-shaped (cone-shaped, pyramid-shaped and the like) projection or a conic solid stool-shaped (conical stool-shaped, pyramid stool-shaped and the like) projection.

Figure 5:
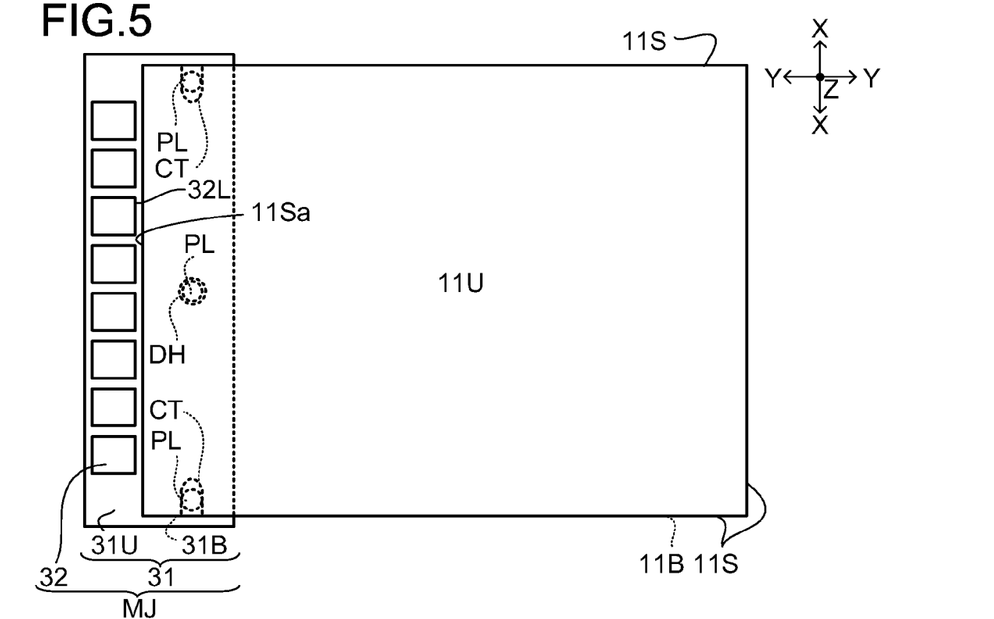
FIG. 5 is a plan view of a light guide plate and an LED module.

Besides, in the case where the plurality of engagement portions (the dimple DH and the cutout CT) are formed, as shown in FIG. 5, the sectional shape of one dimple DH (e.g., a central engagement portion of the three engagement portions arranged in parallel with one another) may be a perfect circle whose length along the light emission direction of the LED 32 and whose length perpendicular to the light emission direction of the LED 32 are equal to each other; and the transversal sectional shape of the shaft PL, which fits in the perfect circular dimple DH may be a perfect circle that tightly fits between the opposing inner walls of the dimple DH.

According to this, the dimple DH having the perfect circular sectional surface and the shaft PL having the perfect circular sectional surface tightly touch each other, accordingly, define a reference position. On the other hand, the remaining two cutouts CT do not tightly touch the shaft PL in the X direction (in short, there is a clearance between the cutout CT and the shaft PL.). Because of this, even if the dimple DH and the shaft PL, which define the reference position, fit in each other, the two cutouts CT and the shaft PL easily fit in each other. Accordingly, the assembly of the LED module MJ and the light guide plate 11 does not become onerous, and the light guide plate 11 does not move in the surface direction (the XY plane direction) of the mount board 31.

Figure 6:
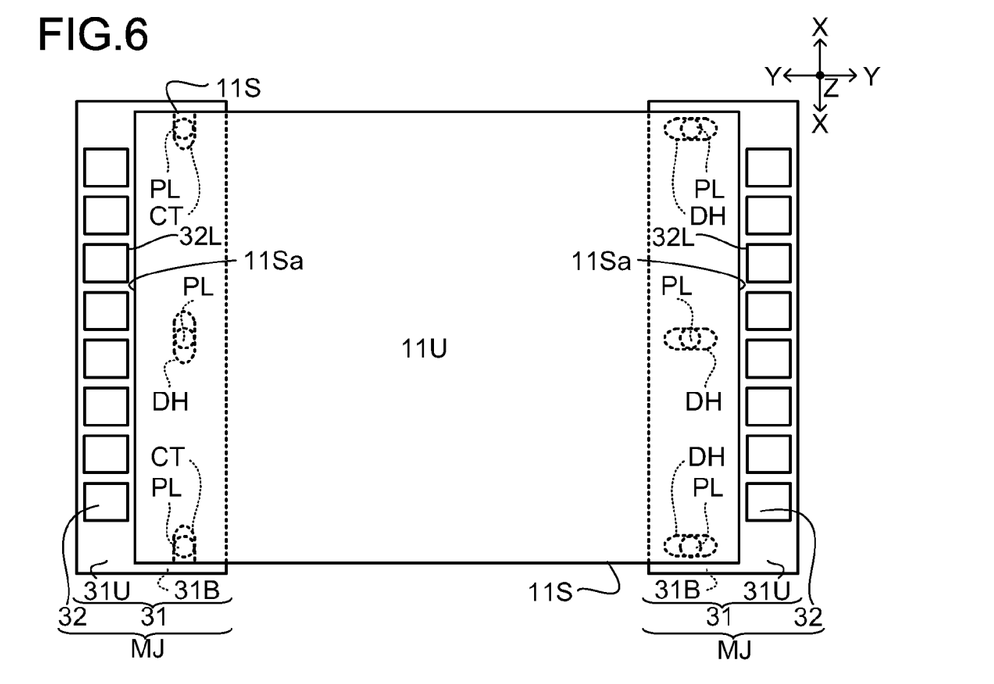
FIG. 6 is a plan view of a light guide plate and an LED module.

Besides, in the above description, the LED module MJ is disposed on one side surface 11S of the light guide plate 11, which is however not limiting. For example, as shown in FIG. 6, the LED module MJ may be disposed on the opposing two side surfaces 11S. In other words, the opposing two side surfaces 11S of the light guide plate 11 may function as the light reception surface 11Sa.

And, it is desirable that the backlight unit 49 shown in FIG. 6 is structured as described hereinafter. Specifically, it is desirable that the sectional shape of the engagement portion (the dimple DH and the cutout CT) near one light reception surface 11Sa of the two light reception surfaces 11Sa has a short edge along the light emission direction of the LED 32 and a long edge perpendicular to the light emission direction of the LED 32 (e.g., an elliptic sectional shape that has a minor axis along the short edge and a major axis along the long edge, or a tongue-shaped sectional shape that includes an elliptic shape); and the transversal sectional shape of the shaft PL has a width (e.g., a perfect circular sectional shape) that tightly fits into the gap between the inner walls of the long edge of the cutout CT and the dimple DH.

Further, it is desirable that the shape of the engagement portion (the dimple DH) near the other light reception surface 11Sa of the two light reception surfaces 11Sa has a long edge along the light emission direction of the LED 32 and a short edge perpendicular to the light emission direction of the LED 32 (e.g., an elliptic sectional shape that has a minor axis along the short edge and a major axis along the long edge); and the transversal sectional shape of the shaft PL has a width (e.g., a perfect circular sectional shape) that tightly fits into the gap between the inner walls of the long edge of the dimple DH.

According to this, at the side of the one light reception surface 11Sa, the shaft PL fits into the cutout CT and the dimple DH, whereby the light guide plate 11 comes not to move with respect to the mount board 31 (i.e., the distance between the light reception surface 11Sa and the light emitting surface 32L of the LED 32 becomes constant). On the other hand, at the side of the other light reception surface 11Sa, even if the light guide plate 11 thermally expands thanks to the light form the LED 32 to extend in the X direction, the extension is not excessively limited (e.g., the shaft PL is not be broken despite the thermal expansion of the light guide plate 11.). In addition, there is a little clearance between the shaft PL and the dimple DH, accordingly, the assembly of the LED module MJ and the light guide plate 11 is also easy.

Figure 7:
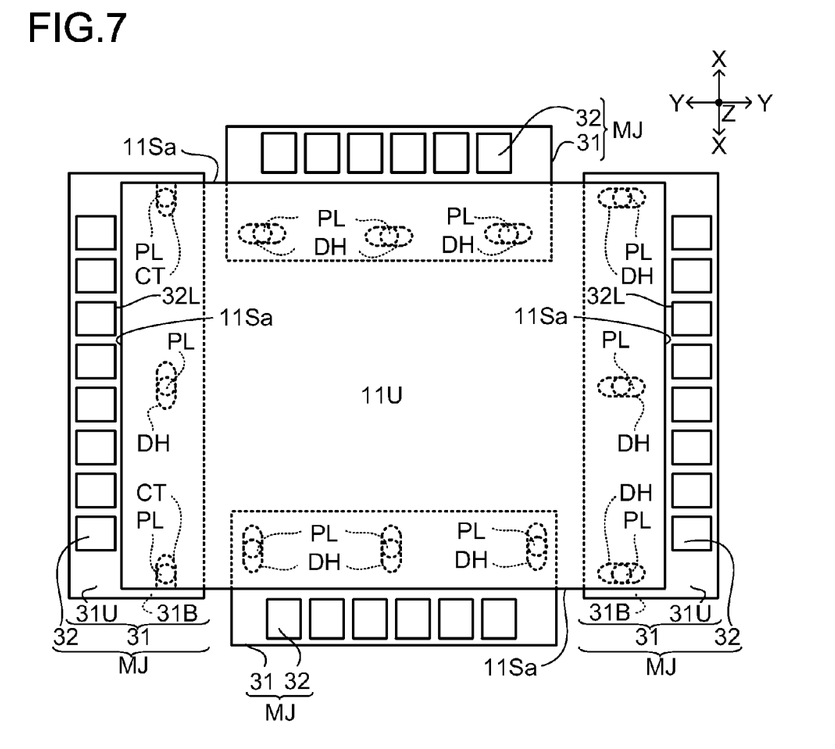
FIG. 7 is a plan view of a light guide plate and an LED module.

Besides, the number of LED modules MJ may be four as shown in FIG. 7. Specifically, as shown in FIG. 7, the LED module MJ may be disposed not only on the opposing two side surfaces 11S shown in FIG. 6 but also on the other pair of opposing two side surfaces 11S. In other words, all the side surfaces 11S of the light guide plate 11 may function as the light reception surface 11Sa.

Her, as shown in FIG. 7, the sectional shape of the engagement portion (the dimple DH) near one light reception surface 11Sa of the other pair of two light reception surfaces 11Sa has a short edge along the light emission direction of the LED 32 and a long edge perpendicular to the light emission direction of the LED 32 (e.g., an elliptic sectional shape that has a minor axis along the short edge and a major axis along the long edge); and the transversal sectional shape of the shaft PL, which fits into the engagement portion near the one light reception surface 11a, has a width (e.g., a perfect circular sectional shape) that tightly fits into the gap between the inner walls of the long edge of the dimple DH.

Further, the sectional shape of the engagement portion (the dimple DH) near the other light reception surface 11Sa of the other pair of two light reception surfaces 11Sa has a long edge along the light emission direction of the LED 32 and a short edge perpendicular to the light emission direction of the LED 32 (e.g., an elliptic sectional shape that has a minor axis along the short edge and a major axis along the long edge); and the transversal sectional shape of the shaft PL, which engages with the engagement portion near the one light reception surface 11Sa, has a width (e.g., a perfect circular sectional shape) that tightly fits into the gap between the inner walls of the long edge of the dimple DH.

REFERENCE SIGNS LIST

PL shaft (stator)
CT cutout (engagement portion)

DH dimple (engagement portion)
HL opening (engagement portion)
11 light guide plate
11U top surface of light guide plate
11B bottom surface of light guide plate
11S side surface of light guide plate
11Sa light reception surface of light guide plate
MJ LED module
31 mount board
31U mount surface
31B non-mount surface
31H opening (engagement portion) of mount board
32 LED (light source)
32L light emitting surface of LED
41 reflection sheet
42 backlight chassis (housing body)
42B bottom surface of backlight chassis
42P step of bottom surface of backlight chassis
42Ps step wall
42S side wall of backlight chassis
43 diffusion plate
44 prism sheet
45 lens sheet
49 backlight unit (illumination apparatus)
59 liquid crystal display panel (display panel)
69 liquid crystal display device (display device)

The invention claimed is:

1. An illumination apparatus, comprising:
a light source;
a mount board on which the light source is mounted;
a light guide plate that faces a light reception surface toward a light emission direction of the light source to receive light via the light reception surface; and
a shaft that extends in a direction intersecting the light emission direction, touches the mount board and the light guide plate overlying each other, and fixes the mount board and the light guide plate.

2. The illumination apparatus according to claim 1, wherein
the shaft is disposed on the mount board; and
the light guide plate is provided with an engagement portion that engages with the shaft.

3. The illumination apparatus according to claim 2, wherein
the illumination apparatus meets a formula described below:

$$RL \leq GL/4$$

where
RL: a shortest distance from the light reception surface to the engagement portion;
GL: a total length of the light guide plate in a direction along the light emission direction of the light source.

4. The illumination apparatus according to claim 2, wherein
the engagement portion is a dimple, a cutout, or an opening.

5. The illumination apparatus according to claim 4, wherein
a sectional shape of the engagement portion in a sectional direction with respect to a surface direction identical to a light output surface of the light guide plate has:
a short edge along the light emission direction of the light source; and
a long edge perpendicular to the light emission direction of the light source; and
a transversal sectional shape of the shaft in the sectional direction has a width that tightly fits in a gap between inner walls of the long edge of the engagement portion.

6. The illumination apparatus according to claim 5, wherein
the sectional shape of the engagement portion is (i) an elliptic shape that has a minor axis along the short edge and a major axis along the long edge, or (ii) a tongue shape that includes an elliptical shape; and
the transversal sectional shape of the shaft is a circle that tightly fits in the gap between the inner walls of the long edge of the engagement portion.

7. The illumination apparatus according to claim 4, wherein
the light source is configured to supply the light to opposing first and second side surfaces of the light guide plate and the first and second side surfaces each define the light reception surface;
the engagement portion includes a first engagement portion adjacent the first side surface of the first light guide plate and a second engagement portion adjacent the second side surface of the light guide plate;
a sectional shape of the first engagement portion in a sectional direction with respect to a surface direction identical to a light output surface of the light guide plate has:
a first short edge along the light emission direction of the light source, and
a first long edge perpendicular to the light emission direction of the light source;
a transversal sectional shape of the shaft, which fits in the first engagement portion, in the sectional direction has a first width that tightly fits in a gap between inner walls of the first long edge;
a sectional shape of the second engagement portion in the sectional direction has:
a second long edge along the light emission direction of the light source, and
a second short edge perpendicular to the light emission direction of the light source; and
a transversal sectional shape of the shaft, which fits in the second engagement portion, in the sectional direction has a second width that tightly fits in a gap between inner walls of the second long edge.

8. The illumination apparatus according to claim 4, wherein
the light guide plate has a plurality of the engagement portions
a sectional shape of one of the engagement portions in a sectional direction with respect to a surface direction identical to a light output surface of the light guide plate is a circle whose length along the light emission direction of the light source and whose length in a direction perpendicular to the light emission direction of the light source are equal to each other; and
a transversal sectional shape of the shaft, which fits in the engagement portion having the circle as the sectional shape, is a circle that tightly fits in the gap between inner walls of the engagement portion.

9. The illumination apparatus according to claim 1, further comprising
a housing body that houses the light source, the mount board, the light guide plate and the shaft, wherein
the shaft is disposed on the housing body; and
the light guide plate and the mount board are each provided with an engagement portion that engages with the shaft.

10. A display device, comprising:
an illumination apparatus; and a display panel configured to receive light from the illumination apparatus, wherein the illumination apparatus comprises:
- a light source;
- a mount board on which the light source is mounted;
- a light guide plate having a light reception surface that faces toward a light emission direction of the light source to receive light via the light reception surface; and
- a shaft that extends in a direction intersecting the light emission direction, touches the mount board and the light guide plate overlying each other, and fixes the mount board and the light guide plate.

* * * * *